United States Patent
Steinrisser et al.

(10) Patent No.: US 7,376,934 B2
(45) Date of Patent: May 20, 2008

(54) PROGRAMMABLE GRAVIMETRIC MEASURING INSTRUMENT, METHOD FOR CREATING AN APPLICATION SOFTWARE, SYSTEM WITH A PROGRAMMABLE GRAVIMETRIC MEASURING INSTRUMENT, AND SOFTWARE FOR EXECUTING THE METHOD FOR CREATING AN APPLICATION SOFTWARE

(75) Inventors: Markus Steinrisser, Männedorf (CH); Slegfried Gluvakov, Bubikon (CH)

(73) Assignee: Mettler-Toledo AG, Grifensee (CH)

( * ) Notice: Subject to any disclaimer, the term of this patent is extended or adjusted under 35 U.S.C. 154(b) by 1082 days.

(21) Appl. No.: 10/458,650

(22) Filed: Jun. 11, 2003

(65) Prior Publication Data

US 2003/0233633 A1 Dec. 18, 2003

(30) Foreign Application Priority Data

Jun. 14, 2002 (EP) .................................. 02100713

(51) Int. Cl.
*G06F 9/44* (2006.01)
(52) U.S. Cl. ...................... 717/109; 717/107; 717/108; 717/117; 717/125; 717/126; 717/127
(58) Field of Classification Search ...................... None
See application file for complete search history.

(56) References Cited

U.S. PATENT DOCUMENTS 4,953,075 A * 8/1990 Nau et al. ..................... 700/17
5,812,394 A * 9/1998 Lewis et al. .................. 700/17

FOREIGN PATENT DOCUMENTS

WO 9532476 A 11/1995

OTHER PUBLICATIONS

Pichlik Bilder-Code Grafische Programmierumberbung National Instruments LabView 6.1, Ct Magazin Fuer Computer Technik, Verlad Heinz Heise GmbH., Hannover, DE., Nr. 3, Jan. 29, 2001—p. 88 XP000987432.
Mayr Programmieren: Einfacher Geht's Nicht Technische Rundschau, Hallwag Verlag Bem, Ch. Bd. 89, Nr. 10, 7, Mar. 1997, pp. 22-26—XP000691506—ISSN 1023-0823.
Press Release Labtronics: "Balance Automation Software meets 21 CFR Part II requirements" XP002221878—7 pages.

* cited by examiner

*Primary Examiner*—Chuck Kendall
(74) *Attorney, Agent, or Firm*—Buchanan Ingersoll & Rooney PC (57) ABSTRACT

System with a computer for computer-aided creation of an application program, wherein the computer contains a software module, a display device, and an input device. The system has a gravimetric measuring instrument for execution of the application program, and a communications link. The computer executes the following steps:
  Representation, selection, and linkage of several application modules on the display device;
  Conversion of the selected application modules and the link into an invalidated application program;
  Validation of the application program by applying a prescribed rule-set, wherein
  i) the application program is released for use if the validation is completed successfully, or
  ii) computer-aided adaptation of the application program with renewed computer-aided validation is made possible if the validation was not successful.

36 Claims, 7 Drawing Sheets

PROGRAMMABLE GRAVIMETRIC MEASURING INSTRUMENT, METHOD FOR CREATING AN APPLICATION SOFTWARE, SYSTEM WITH A PROGRAMMABLE GRAVIMETRIC MEASURING INSTRUMENT, AND SOFTWARE FOR EXECUTING THE METHOD FOR CREATING AN APPLICATION SOFTWARE

CROSS-REFERENCE TO RELATED APPLICATIONS

This application claims priority under 35 U.S.C. §119 to EP Application No. 02100713.3 filed in the EPO on Jun. 14, 2002, the entire contents of which is incorporated herein by reference.

BACKGROUND

The invention relates to gravimetric measuring instruments, and to systems with a gravimetric measuring instrument, and to the creation of application programs for execution by a gravimetric measuring instrument. Particularly affected are electronic balances and/or scales which are linked via a network connection to a network and a computer, or which can be linked directly to a computer via a serial interface, USB, or wireless connection.

Normally, balances and/or scales, as they are used in research, development, and production, are realized as independent devices which require only an electric power supply to be capable of use.

There are electronic balances and/or scales which have a network interface and can be operated in an internetwork. Normally, for this purpose, the balance or scale is fitted with a simple RS-232 interface. The possibilities afforded by connection to a network are not exhausted by any means. Applications are now being developed which increasingly make use of connection to a network.

In laboratories, particularly in industrial manufacturing, there are numerous processes which require exact reproducibility of all process-steps. For this purpose, exact and unmodifiable documentation is an absolute necessity. Many institutions and companies have either created their own rules (called, for example, "Standard Operating Procedures") for defining and documenting the processes in their laboratories or manufacturing plants, or they use sets of rules which are laid down, for example, in the form of standards or legal regulations.

An example of a software-based solution which supports the creation of "Standard Operating Procedures" (SOP) is described in European Patent Application 02100040.1 with the title "Programmable Device with a Gravimetric Measuring Instrument, Method of Programming such a Device, and Software for Executing this Method". This application was submitted on Jan. 18, 2002 in the name of the company Mettler Toledo GmbH, and is hereby incorporated by reference in its entirety.

A further example of a software which allows definition of certain SOPs is the "Balance Data System" (BDS) of the company Labtronics Inc. of Canada. This is a software which supports and simplifies use of scales and balances. The software guides the user through the process, and ensures that the SOPs are complied with. Details of BDS can be found, for example, in the brochure "BDS Balance Data System" of Labtronics Inc., which at the time of the application can be ordered from http://www.balanceinfo.com/bds.htm. However, associated with BDS is the disadvantage that data communication between the computer on which BDS is installed, and the gravimetric measuring instrument, must be installed at all times; alternatively, connected to the measuring instrument can be a simpler instrument such as a PDA, on which a minimum part of BDS is installed, and which serves as a storage buffer for the data, the latter being then transported to the BDS computer via a different route. The BDS only allows definition and execution of a closed sequential procedure, and therefore has only limited flexibility. Depending on the configuration and application, the user must alternately make inputs to the computer and to the scale/balance, which is a hindrance.

Especially in the pharmaceutical, food, and chemical field, as well as in the medical and health fields, adherence to prescribed procedures and rules is important. Under certain circumstances, for example, the approval of a medicine, or the certification of industrial procedures, depends on whether the respective institution or company is able to guarantee adherence to prescribed procedures and rules. Aspects which are of importance in this connection are: use management (e.g. the assignment of rights of use); access security; identification and authentication of users; audit trail (e.g. in the form of a record of all relevant steps); change management (e.g. in the form of a record of all changes); and central data storage, to quote a few examples.

A known example is the so-called Title 21 Code of Federal Regulations (CFR) Part 11, which is increasingly followed in the USA and other countries.

There are, for example, so-called laboratory information management systems (LIMS) which allow all steps and operations to be documented meticulously.

SUMMARY

The present invention is directed to a method which allows an application program to be created for balances, scales, and other gravimetric measuring instruments, and to verify whether such an application is rule-compliant.

The invention can provide gravimetric measuring instruments which are capable of rule-compliant execution of an application program.

The invention can provide a corresponding software and a total system.

Various advantages of the invention are either stated in the description, or result from it.

BRIEF DESCRIPTION OF THE DRAWINGS

Details and advantages of the invention are described in detail below by reference to various exemplary embodiments, and by reference to the drawings which form an integral part of the disclosure of the present invention. According to the invention.

BRIEF DESCRIPTION OF THE PREFERRED EMBODIMENTS

The invention can be used for determination of mass on the most diverse measuring instruments, especially on laboratory instruments with at least one gravimetric measuring instrument (e.g. in the form of a weighing cell). These include, among others, dryers and comparators, as well as other instruments such as weighing modules in production lines. For the sake of simplicity, the invention is described below mainly in relation to electronic balances, but this is not to be interpreted as a restriction.

The term "application program" is understood to mean a form of representation which describes one or more process-steps or actions capable of being executed by a gravimetric measuring instrument (for example, an electronic balance). The language in which the process-steps are defined is immaterial. The process-steps can, for example, be described in a form of script, which is then translated into a form of machine language or suchlike, before being executed step-by-step by the balance. However, the translation can also take place within a validation.

Figure 1:
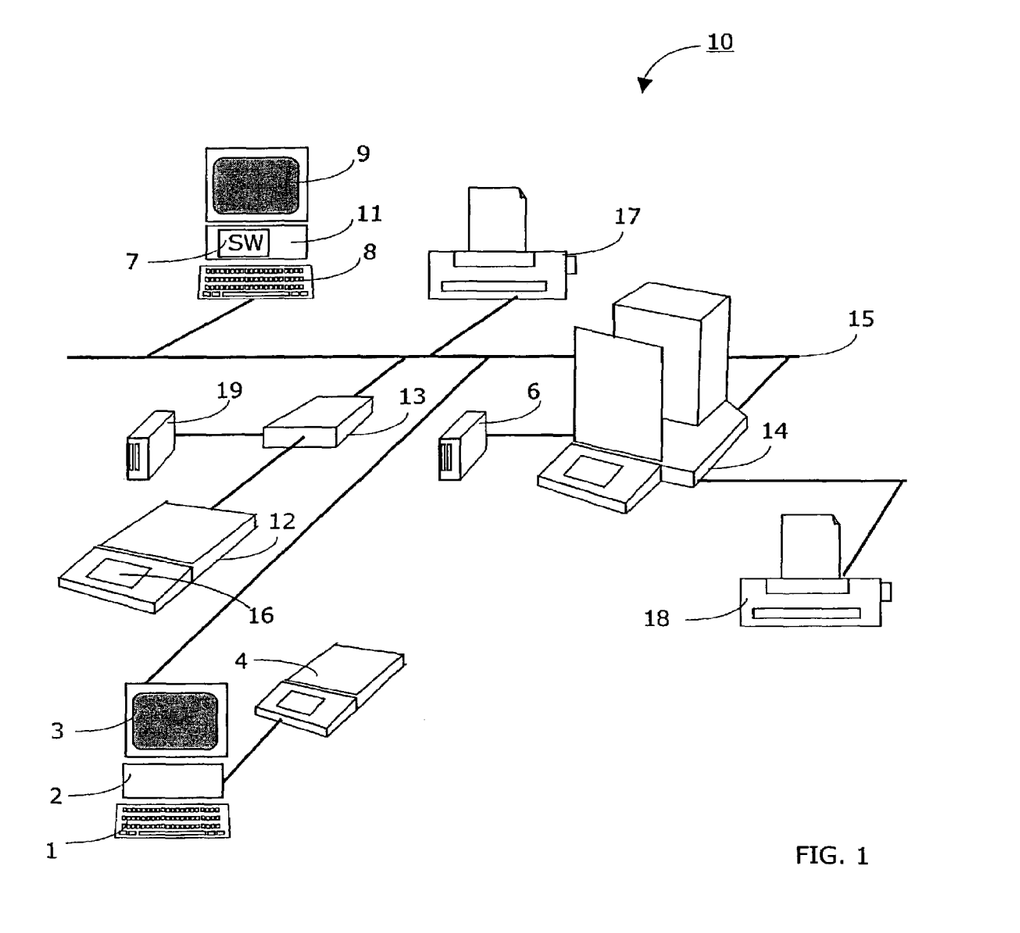
FIG. 1 shows a diagrammatical representation of a first total system according to an exemplary embodiment of the invention.

A first embodiment of the invention can be seen in the diagrammatic representation in FIG. 1. A (total) system 10 is shown, which has three electronic measuring instruments 4, 12, and 14 (e.g. analytical balances, precision balances, comparator balances, microbalances, or similar). The balance 12 is connected via an external network interface 13 to a network 15 and a computer 11. The balance possesses a built-in network interface (not shown in FIG. 1), which can be constructed in similar manner to the network interface 13. Via a computer 2, which has a built-in network interface, the balance 4 is connected to the network 15. In the example shown, the computer 2 has a display 3 in the form of a screen, and an input unit 1 in the form of a keyboard. The balance 12 is connected via the network interface 13 to a bar code scanner 19. The balance 14 is in direct connection with a bar code scanner 6. The computer 11, the measuring instruments 4, 12, 14, and the network interfaces are realized in such manner that establishment of a communications link between the measuring instruments 4, 12, 14, and the computer 11 is possible. In the example shown, the computer 11 has a display 9 in the form of a screen, and an input unit 8 in the form of a keyboard.

On the computer 11 it is possible to run a software module 7. For this purpose, either a standard operating system or a special operating system may be present. The aforementioned network interfaces are realized in such manner as to be capable of receiving an application program via the network 15, and making the balances 4 and/or 12 and/or 14 ready. This application program is transmitted by the computer 11 to the network interface, or fetched from the computer 11.

Figure 2A:
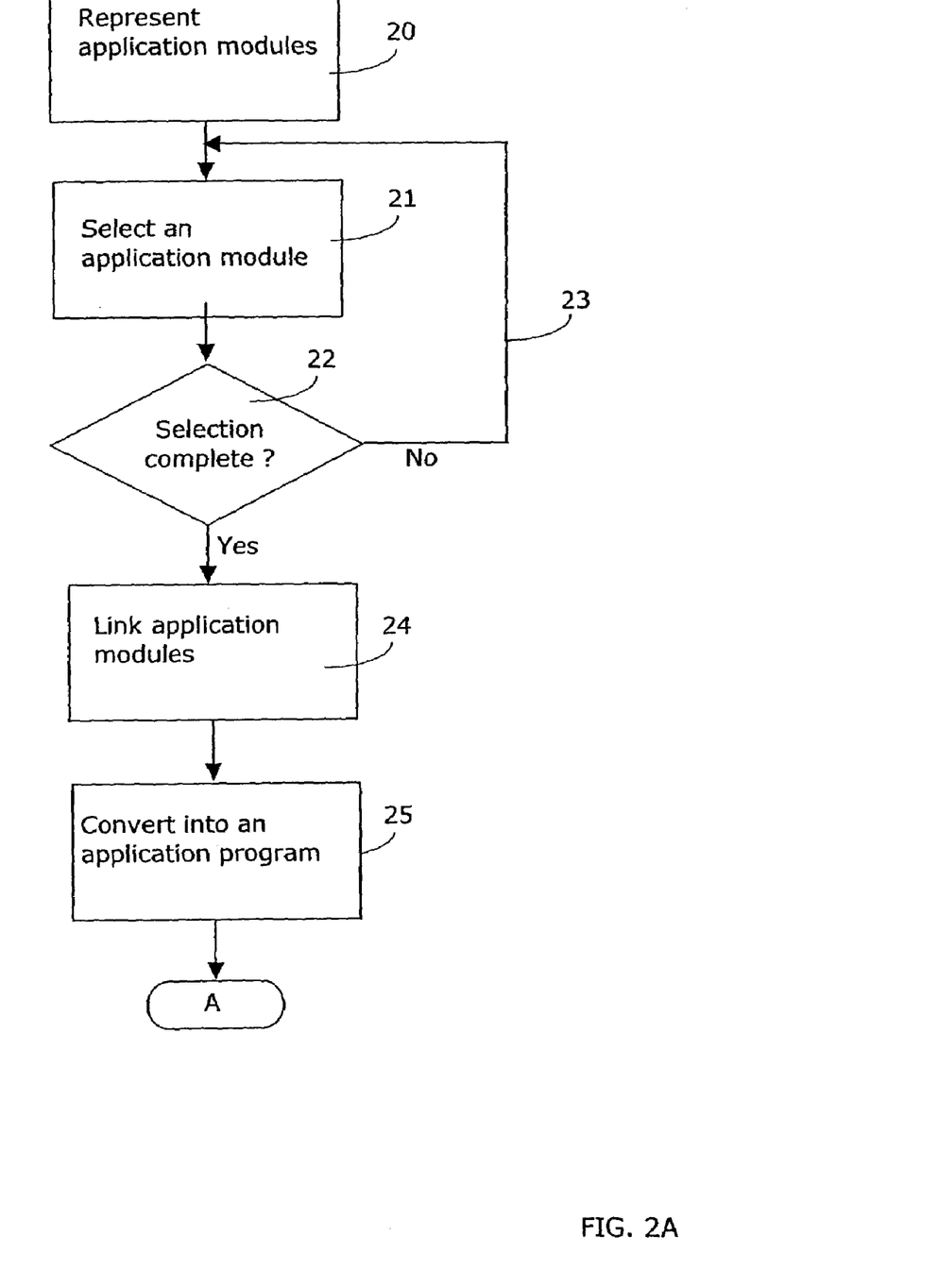
FIGS. 2A-2B show a diagrammatical flow chart of a first exemplary method according to an exemplary embodiment of the invention.
Figure 2B:
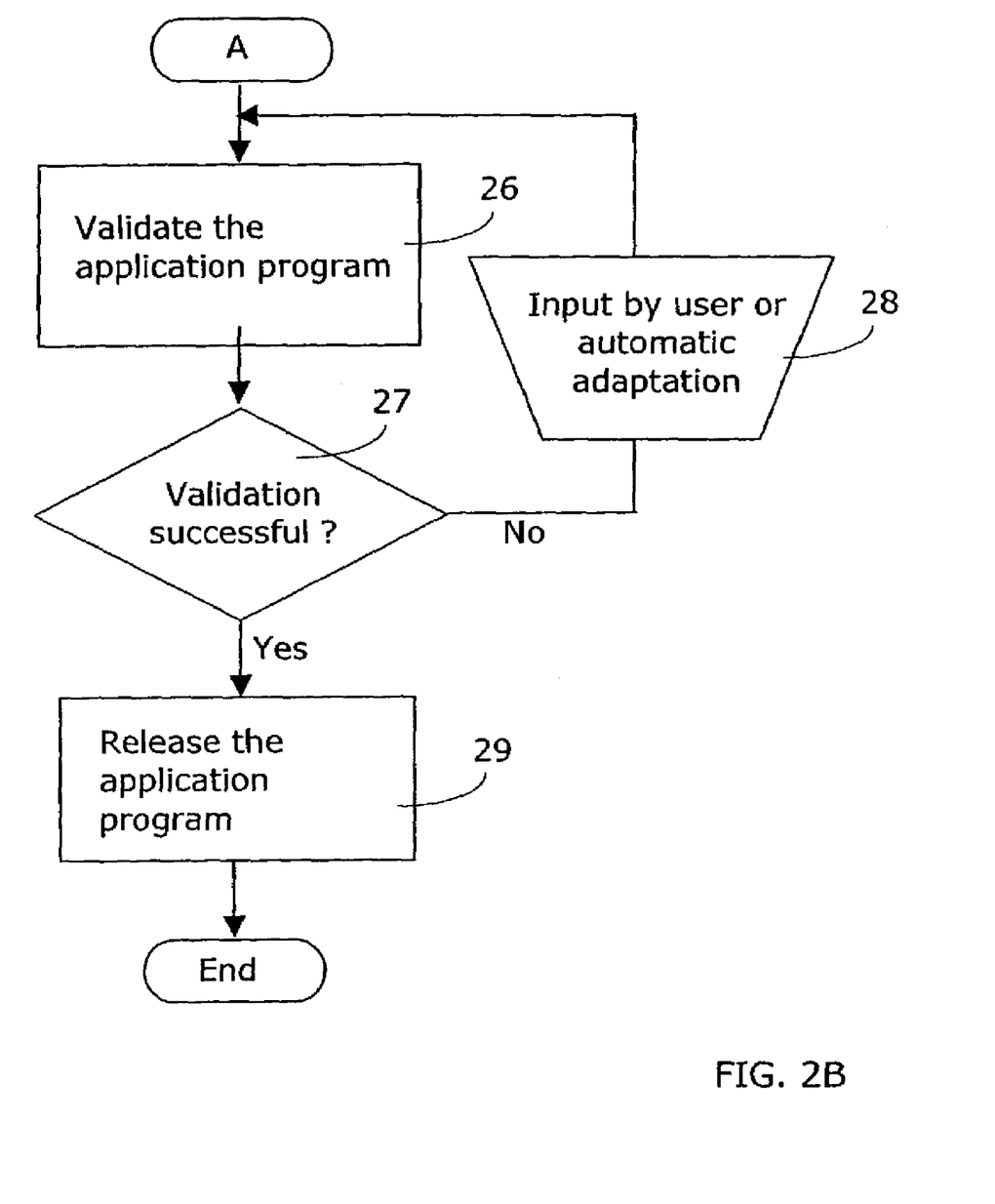

In the described system 10, the following method for computer-aided creation of an application program can be executed. The steps of the method are shown in FIGS. 2A and 2B as a diagrammatical flowchart. For this purpose, the software module 7 is started and executed by the computer 11. The method encompasses the following steps:

Representation of several application modules (Block 20, FIG. 2A) on the display device 9, preferably in the form of graphical elements.

Selection of a first application module (Block 21, FIG. 2A) by means of the input device 8.

Selection of a first application module (Block 21, FIG. 2A) by means of the input device 8. This selection can be repeated several times, as represented in FIG. 2A by the rhombus 22 in combination with the loop 23.

Linkage of the first application module with the second application module (Block 24, FIG. 2A), and with further application modules if present. The linkage can take place, for example, by means of the input device 8, and determines the chronological sequence of the first application module, and of the second application module and further application modules if such are present.

Convert (Block 25, FIG. 2A) the selected application modules and the link(s) into an invalidated application program. The conversion is performed by the computer 11 with the aid of the software module 7.

In a subsequent block of steps (represented in FIG. 2B), there now follows a computer-aided validation of the invalidated application program (Block 26, FIG. 2B), a prescribed set of rules being applied in the validation. According to the invention, the application program is (only) released for use (Block 29, FIG. 2B) if this validation was successfully completed (Rhombus 27, FIG. 2B). Otherwise, there follows a computer-aided adaptation of the application program (Block 28, FIG. 2B), subsequent to which a computer-aided validation (Block 26, FIG. 2B) is executed anew.

Figure 3:
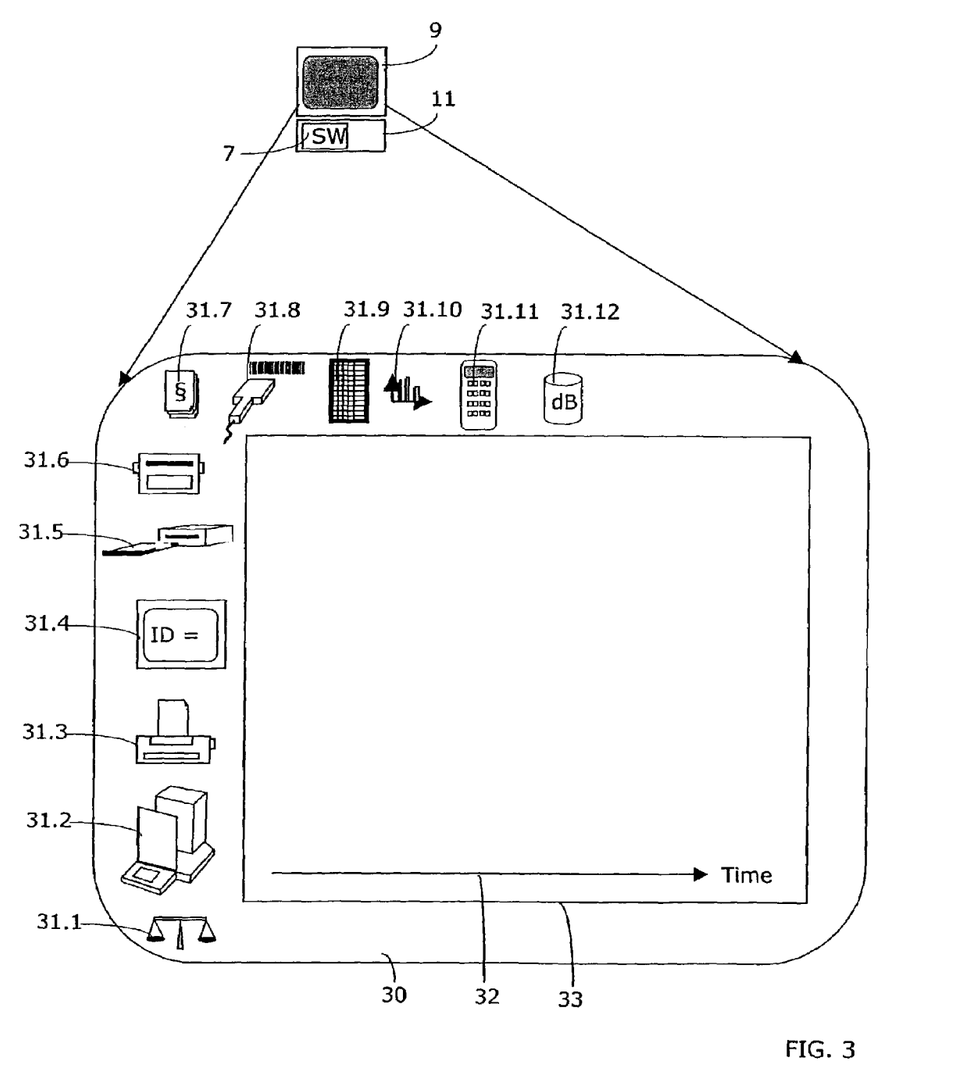
FIG. 3 shows a diagrammatical representation of an input mask with worktop according to an exemplary embodiment of the invention.

Further details of an exemplary embodiment of the method according to the invention are described in relation to FIGS. 3, 4A, 4B, and 4C. FIG. 3 shows diagrammatically by reference to an example how several application modules 31.1-31.12 can be represented on the display device 9 in the form, for example, of graphical elements. The application modules 31.1-31.12 are preferably represented in the form of small pictograms. This form of representation is to be understood as an example. Self-evidently, the designation of an application module can take place in any suitable form, for example as descriptive text. Within the scope of this description, and in the patent claims, such a text block is also included in the term "graphical element".

The software module 7 triggers representation of a program window 30. Within the program window 30, a worktop 33 can be displayed. Provided at the lower edge of the worktop 33 is a time axis 32 for the purpose of allowing the application modules 31.1-31.12 to be set in a chronological relationship.

The application modules 31.1-31.12 represent the following systems/components/steps:

31.1 A symbol which indicates that a weighing step is to be performed on a gravimetric measuring instrument;

31.2 A gravimetric measuring instrument (e.g. a balance);

31.3 A work-station printer;

31.4 A symbol which indicates that the user must identify him/herself with an electronic signature by entering, for example, a user identification (ID) and a password (PW);

31.5 A card reader for reading in a smartcard or suchlike;

31.6 A network printer;

31.7 A symbol which indicates that according to the rules-set, storage of electronic documents takes place;

31.8 A manual bar code reader to read in a bar code;

31.9 A symbol which indicates that results are transferred to a spreadsheet;

31.10 A symbol which indicates that results are represented in the form of a diagram;

31.11 An evaluation unit to perform calculations/evaluations;

31.12 A database.

Figure 4A:
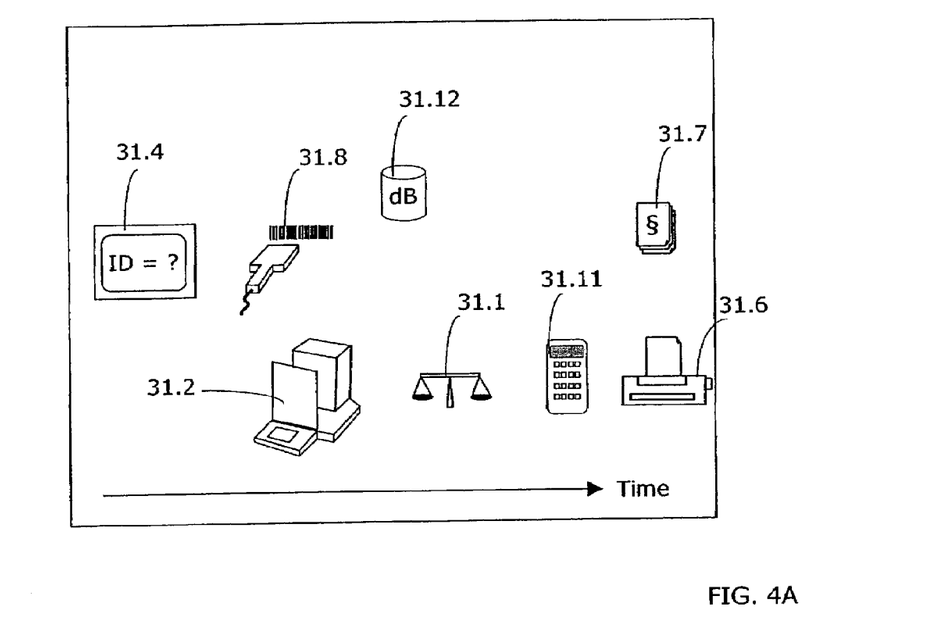
FIGS. 4A-4C show a diagrammatical representation of the worktop of FIG. 3 according to an exemplary embodiment of the invention.
Figure 4B:
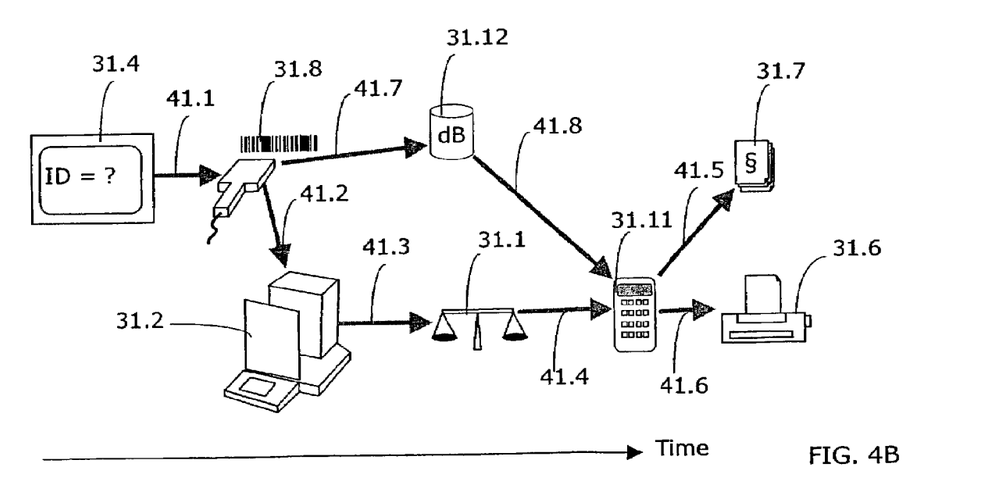
Figure 4C:
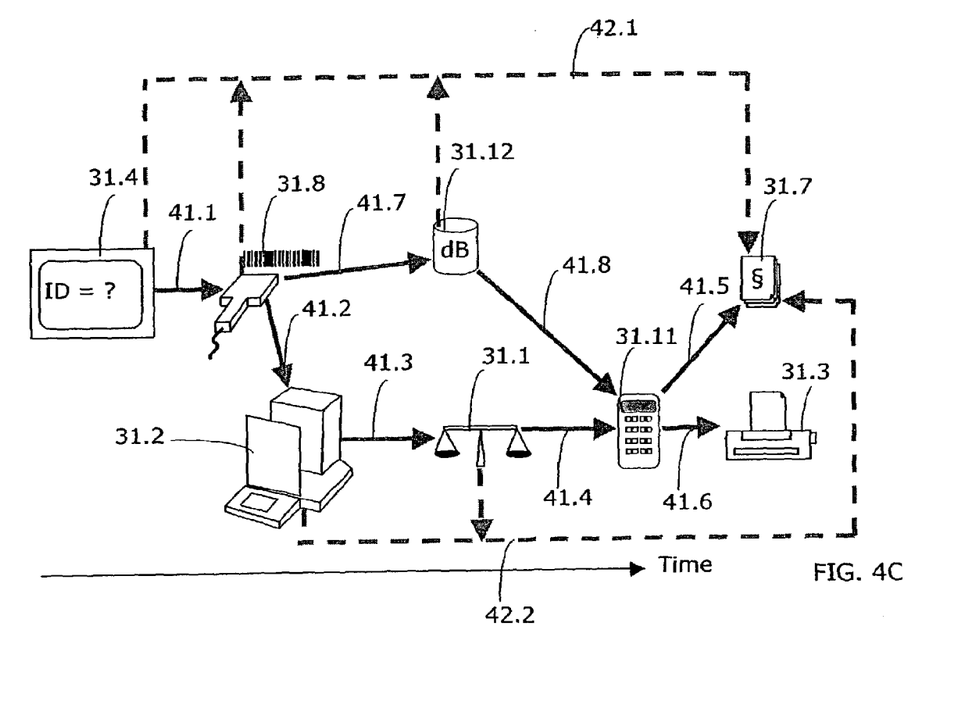

The representation in FIGS. 4A-4C is highly schematic to facilitate description of underlying principles of the invention.

After the software module 7 has represented the worktop 33 on the display 9, the user can select on the computer 11 one or more of the various application modules 31.1-31.12 and place it/them on the worktop 33. This operation can, for example, be executed with a computer mouse by simple drag-and-drop actions.

In FIG. 4A, a momentary situation is shown after the application modules 31.4, 31.8, 31.2, 31.12, 31.1, 31.11, 31.7, and 31.6 have been placed. In one of the next steps, linking takes place of the application modules 31.4, 31.8, 31.2, 31.12, 31.1, 31.11, 31.7, and 31.6. Linking of the application modules can, for example, be performed with the input device (computer mouse). According to the invention, a link describes the chronological sequence of the various application modules in relation to each other. For this purpose, for example, a time axis 32 can be provided to arrange the application modules along the time axis 32. It is, for example, also conceivable that the links represented by gray arrows are numbered consecutively in chronological order, so as to determine a chronological sequence.

In FIG. 4B, links 41.1-41.8 are shown as gray arrows. The links 41.1-41.8 specify the chronological sequence in which the process-steps represented by the various application modules 31.4, 31.8, 31.2, 31.12, 31.1, 31.11, 31.7, and 31.6 are to be executed. The sequence shown was assembled by the user to cause the computer 11 in conjunction with the software module 7 to generate an application program which executes, or aids execution of, the following steps:

Request a user identification (application module 31.4).

After a user has identified himself by entering his ID and PW, the user is requested to identify exactly by means of the manual bar code reader the substance to be weighed (application module 31.8). For this purpose, the package, for example, of the substance to be weighed can be provided with a corresponding bar code, which is read by the bar code reader.

The balance or scale is loaded with the substance to be weighed (application module 31.2).

Execute a weighing step (application module 31.1).

Inquire substance information relating to the substance to be weighed from a memory (application module 31.12). The inquiry takes place using the information which the bar code reader supplies (link 41.7).

Transfer the measurement values from the weighing step to an evaluation unit (application module 31.11). The evaluation unit is also provided with substance information from the memory (link 41.8).

The evaluation unit performs prescribed calculation/ evaluation steps, and transfers the results to a local printer (application module 31.6).

In addition, the results are transferred to a system which manages their documentation (application module 31.7).

When the links have been created, a first part of the exemplary method according to an exemplary embodiment of the invention is complete, and an invalidated application program is available. This invalidated application program can be temporarily stored for forwarding at a later time to a validation. The further processing can also proceed hand-in-hand with the creation of the application program.

According to an exemplary embodiment of the invention, the computer-aided validation of the exemplary method defined by the user can also take place immediately following the creation of the invalidated application program. Before the invalidated application program is validated, it can be converted from one programming or machine language into another.

The validation of the application program takes place by application of a rule-set which is prescribed. Within the scope of this validation, all relevant aspects of the application program are verified by reference to the rules. The application program defined by the user is only released for use when the validation is successfully completed.

If the validation does not proceed successfully, for example because one of the rules of the rule-set is not fulfilled, the application program can be adapted. This adaptation can take place either manually, in that the user is offered by the software module 7 the possibility to revise the constellation of the application modules and/or its links. The adaptation can also take place with the aid of the computer 11. Thus, the software module 7 can display on the screen 9 which aspects of the application program have caused violation of the rule-set. The user can then start at this point, and make computer-aided corrections with the aid of the input device.

In a further embodiment, the software module 7 delivers proposals for corrections. A proposal for a correction can, for example, be shown by graphical means. This makes manual correction easier. It is also possible for information to be output in text or audio form, to make it easier for the user to correct his application program.

A correction procedure is explained by reference to the example in FIG. 4C. The rule-set used in the example prescribes that all process-steps which are executed must be recorded electronically. Simple documentation of the results which the user specified by means of the link 41.5 between the evaluation unit 31.11 and the application module 31.7 is not sufficient. Validation of the invalidated application program according to FIG. 4B therefore does not proceed successfully. Software module 7 now changes the display on the screen 9 to provide the user with a graphical aid. In the present example, the software module 7 proposes linking each of the application modules 31.4, 31.8, 31.12, 31.2, and 31.1 to the application module 31.7. The proposal is made by displaying dotted arrows 42.1 and 42.2. Users can either accept this proposed correction or make further changes.

After adaptation of the application program, validation is executed by the computer 11 anew.

If the validation 51 of an invalidated application program 50 has executed successfully (see FIG. 5), the application program defined by the user can be released for use. Such an application program is designated here as a validated application program.

Figure 5:
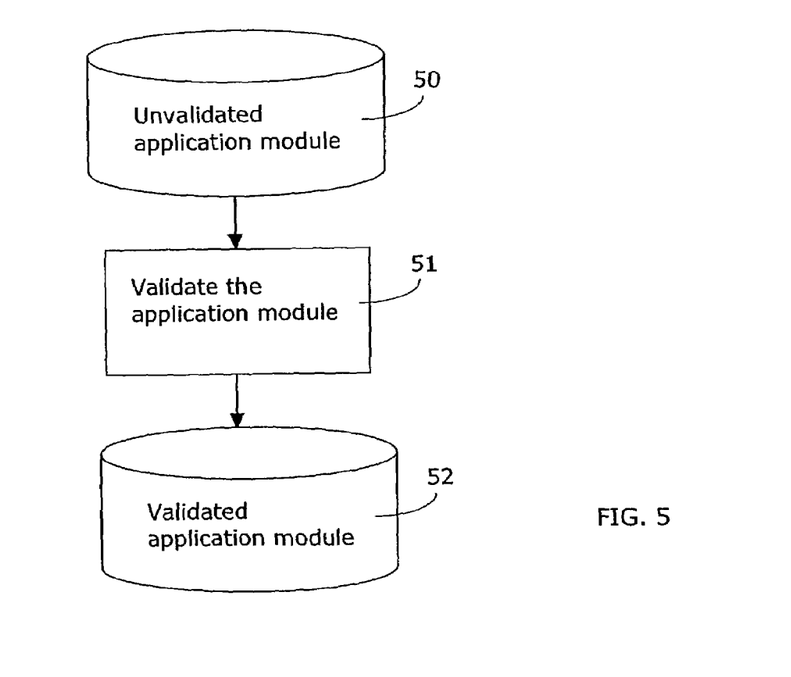
FIG. 5 shows a diagrammatical representation of a methodological aspect according to an exemplary embodiment of the invention.

According to exemplary embodiments of the invention, it is important that the gravimetric measuring instrument should only execute validated application programs 52, or else that an unambiguous designation makes clear that the program is not validated, preferably making a corresponding record. Thus it is possible to create a total system which is rule-compliant.

There are various possible ways of designating an application program as a validated application program. This can be done by setting a flag, or embedding a key, which a gravimetric measuring instrument according to the invention knows how to interpret. Especially suitable are encryption methods such as, for example, Pretty Good Privacy (PGP), where the software module 7 knows the public key of the gravimetric measuring instrument. This key is then used by the software module 7 for encryption of the validated application program. The gravimetric measuring instrument has a private key which remains secret. With this private key, the gravimetric measuring instrument can decrypt the encrypted, validated application program, and then execute it step by step.

The software module 7 can also be so designed that conversion into a machine-readable form only takes place if the validation was successful. In this machine-readable form, the validated application program can then be forwarded to the gravimetric measuring instrument. "Machine-readable" in this connection means that a conversion takes place into a language which can be executed by the processor of the gravimetric measuring instrument (or of the computer).

As stated at the outset, there is, for example, the Title 21 Code of Federal Regulations (CFR) Part 11, which was published in the USA as a regulation by the Food and Drug Administration (FDA) in 1997. 21 CFR Part 11 defines the regulations for transmitting documents in electronic form, and the criteria for using electronic signatures in legally binding form. 21 CFR relates especially to regulations for Good Clinical Practice (GCP), Good Laboratory Practice (GLP), and Good Manufacturing Practice (GMP), with special reference to the pharmaceutical and health industries. Part 11 relates to matters regulated by the FDA in connection with electronic records and electronic signatures.

A system which fulfills 21 CFR Part 11 allows the use and issue of electronic records instead of the usual records in paper form, which are costly to send and store. The risk of deliberate manipulation and falsified results is also reduced. Unauthorized access to data is prevented and, if a corresponding audit trail is laid, records can be traced back to their originators.

Fulfillment of 21 CFR Part 11 cannot be achieved by means of a gravimetric measuring instrument alone. For a company or institution to fulfill 21 CFR Part 11 completely, it is important to use electronic records, and to introduce electronic signatures. All processes which take place in a laboratory or manufacturing system (herein referred to as a total system) should be laid down in SOPs, taking full account of 21 CFR Part 11. It is also necessary that all users of the partial or total system are sufficiently trained in the application of 21 CFR Part 11, and follow its rules.

Both the gravimetric measuring instruments, and the total systems in which such gravimetric measuring instruments according to exemplary embodiments of the invention are used, must fulfill the rules prescribed by the rule-set. The software module 7 for creating the application program therefore takes account of the rule-set in the validation, to ensure that only validated application programs are used. Such a validated application program is the first component of a rule-compliant (total) system. Furthermore, it is important that the gravimetric measuring instrument on which the application program is executed is also rule-compliant.

A rule-compliant gravimetric measuring instrument on which a validated application program is executed is rule-compliant as a system if it is self-contained. Influences from outside must be avoided, or meticulously regulated, to avoid manipulations.

In a total system which has several subsystems, each of the subsystems, each of the connections between these subsystems, and the application program should be rule-compliant.

According to an exemplary embodiment of the invention, the rule-set 60 which is used in the validation of an invalidated application program comprises at least the following two rule-modules: (1) electronic record 61 and (2) electronic signature 62, as indicated diagrammatically in FIG. 6. The rule-set 60 can contain further rule-modules 63-65. The rule-set 60 is connected to the software module 7 via an interface 66.

Figure 6:
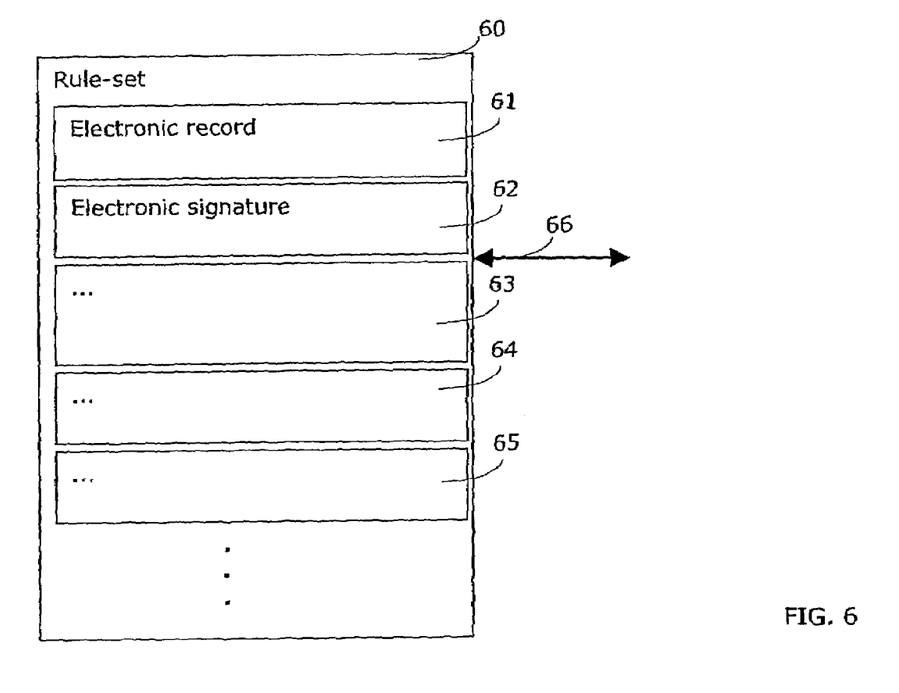
FIG. 6 shows a diagrammatical representation of a set of rules according to an exemplary embodiment of the invention.

In addition, the rule-set 60 can be augmented by a knowledge base which is interrogated by the software module 7 for the purpose of making proposals for correction to the user should a validation fail.

The unique identification and authentication of users is an important component of a rule-compliant system. Only by this means can use of rule-compliant systems, and the generation, modification, storage, and communication of electronic records, be secured. Also by this means, the integrity and confidentiality of the electronic records can be regulated.

According to an exemplary embodiment of the invention, the login before using a rule-compliant gravimetric measuring instrument is one of the application modules, which is an essential prerequisite for creation of an application program. A login application module 31.4 can, for example, prescribe input of a user identification (ID) and password (PW) as electronic signature. Instead of the login application module 31.4, a smartcard or suchlike can be used with a card reader (application module 31.5) for the purpose of allowing the user to identify himself to the system.

In an embodiment, the rule-set can contain rules for the management of users. In this case, it is usual for a database with information about the various users to be provided. When a login is attempted, the application program can access this database to verify whether the person who is attempting to login is authorized to do so, and if the person is so authorized, to which category of user the person should be assigned. By specifying various categories, a rule-compliant system can be protected against unauthorized intervention.

In another embodiment, interventions and/or modifications to a validated application program, or to a rule-compliant system, are only allowed if the user identifies him/herself by an electronic signature (e.g. by inputting an ID and a PW). For this purpose, a special application module can be provided which is used for interventions and/or modifications.

In yet another embodiment of the invention, a so-called audit-trail application module is prescribed. The purpose and objective of this module is generation of secure, computer-generated, time-stamped verification evidence (audit trails) on the electronic documents. Such audit trails make it possible to establish at any time who used a rule-compliant system when, and how. Audit trails can also be built into interventions and/or modifications, so as to make the interventions and/or modifications reconstructible after their occurrence.

According to exemplary embodiments of the invention, there are applications for which the safety and integrity of the stored electronic documents must be assured. For this purpose, a corresponding database rule-module can be provided in the rule-set.

This database rule-module can prescribe, for example, that all important process-steps which an application program controls must be documented in a special database. The application module 31.7 is such a module. All steps are documented in electronic form, and filed in a database. In the database they cannot be removed or changed. Preferably, while recording the steps, an audit trail is also laid.

In a further embodiment of the invention, a secure communications link is required between the gravimetric measuring instrument, on which certain process-steps are executed with assistance from the validated application program according to the invention, and the database. A secure communications link is necessary to prevent unauthorized modification to, or replacement of, electronic documents while these are being, for example, transferred from the balance to the database.

A secure communications link within the meaning of the invention can take different forms, depending on the field of application and the current regulations in the rule-set. Some examples of a secure communications link are described below.

By use of a secure communication protocol for the communication between the gravimetric measuring instrument and the database, the communication as such can be made secure. A secure communication protocol is defined as a protocol which prevents the transmission of transmission errors, and/or which secures the transmission against manipulation from outside.

A secure communications link can also mean that checks are made before and during each communication as to whether the connection is intact. These measures can assist in preventing the situation in which although the gravimetric measuring instrument executes the electronic documentation in all steps, and according to the rule-set sends these electronic documents in the direction of the database, the documents do not arrive at the database, and consequently cannot be filed there, because the communications link is/was interrupted.

A secure communications link can also make it necessary for a gravimetric measuring instrument to be equipped with a temporary memory, in which electronic documents can be saved while problems with the communications link and/or database occur. Should the temporary memory be full, then the application program should interrupt execution of all steps, so that no situation arises which results in violation of the rule-set.

Figure 7:
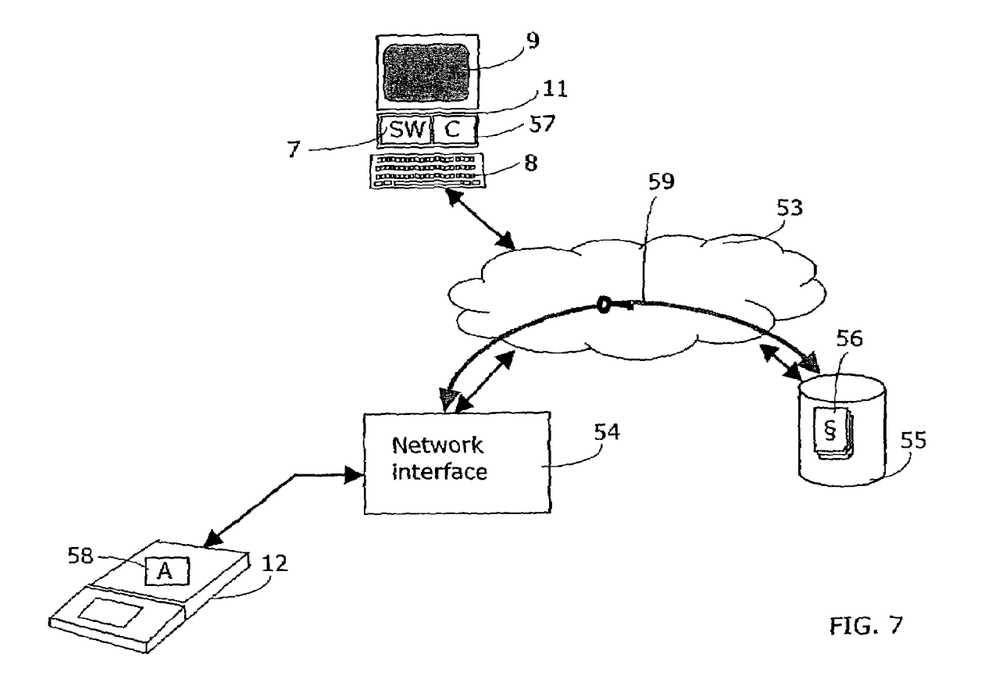
FIG. 7 shows a diagrammatical representation of a second total system according to an exemplary embodiment of the invention.

In another embodiment of the invention, the database 55 for filing electronic documents 56 is subordinated to a central management as shown in FIG. 7. It is, for example, conceivable that this database 55 is controlled and managed by a recognized institution. The transmission of data from the balance 12 to such a database can take place via a secure communications link 59 (indicated in FIG. 7 by the gray double-headed arrow with key). The data can be transmitted by the data being stored on data carriers, and the data carriers being sent to the institution which manages the database 55. There, the data can be copied from the data carrier to the database 55. Such a total system is shown in FIG. 7. The computer 11 with input device 8 and screen 9 includes a software module 7 for creating and validating an application program 58. Furthermore, the computer 11 in the embodiment shown contains a control application 57. The computer 11 can be connected via a network 53 and a network interface 54 to a gravimetric measuring instrument 12. The central database 55 can be reached from the gravimetric measuring instrument 12 via the network interface 54 and the network 53. After the application program 58 has been loaded onto the computer 11 via the network 53, the application program 58 controls the execution of various steps. The control application 57 monitors execution of the steps and compliance with a prescribed rule-set.

In another embodiment according to the invention, a total system assigns to this data store a secure local data store and a secure link. At the same time as the electronic documents are filed in this data store, redundant electronic documents are simultaneously transmitted to another (central) data store. When the redundant documents have been safely filed there, a signal can be sent to the local data store to delete the corresponding data there. As a result, space can be created for newer data.

According to exemplary embodiments of the invention, a method can, for example, proceed with the process-steps shown in FIG. 4C. The method can define a procedure for automatic use of an electronic balance 4, 12, or 14, either with or without peripheral devices, which can be linked for communication with a computer 11 via an external or internal network interface and a network 15. It is self-evident that before, during, or after the specified process-steps, additional steps can be executed.

In a further embodiment of the invention, the network 15 of the system is a standardized bus. In this case, a standard communication protocol can be used for communication between the network interfaces and the computer. This facilitates implementation, since not only can standard components be used (e.g. as bus driver), but also standard software. Preferably, use is made of an Ethernet bus and an IP-based protocol. The bus can be realized with either cable or glass fiber, or as a wireless bus. A very suitable method, for example, is wireless communication with Bluetooth, or a wireless LAN according to the IEEE802.11b standard.

Preferably, the network interface 13 contains means of assuring the security of the communication.

Exemplary embodiments of the present invention are especially suitable for defining, by means of the application program, a process operation, a measurement procedure, or an analytical procedure which is to be performed on a balance. The procedure can be, for example, an interactive procedure in which the measurement procedure begins after a start key is pressed. On the display 16 of the balance 12 (see FIG. 1), an accompanying text or pictogram (for example, supported with acoustic and/or optical signals) can be displayed. Thus, for example, the user can be prompted by displayed text to place the substance to be weighed on the balance.

According to exemplary embodiments of the invention, the following data, for example, can be determined and output: absolute weight, relative weight, temperature, temperature difference, time, date, pressure, air humidity, etc. Self-evidently, which of this data is actually available depends on the type and equipment of the balance being used, the connected peripheral devices with their sensors, and the application program being used.

Preferably, the application modules can be provided as a sort of template (sample). The user can then select a suitable template, and have the parameters displayed which are specified with the template. The parameters can be changed manually. When the template meets the user's requirements, the next application module can be processed/adapted.

According to a further embodiment of the invention, an application program can be assembled from individual modules (subroutines). Some examples of such modules are given below. This list makes no claim to be complete, and is for explanatory purposes only:

Open door (the door of the balance is opened automatically);

Load balance (a prompt, for example as displayed text, is given to load the balance);
"Await stable weight" (this is a routine which waits until the balance becomes stable);
Open or close draft shield;
Raise or lower lift;
Define button;
Display text;
Delete display;
Output text on printer;
Send text to computer;
Open dialog;
Define data format;
etc.

According to a further embodiment, for some of the application modules certain basic settings (defaults) are stored. By means of a double-click on the icon of an application module, these settings can be displayed so that changes can be made if necessary. In this embodiment, these parameters should also be verified during validation, to assure compliance with the rules.

The execution of a validated application program can be accompanied by a control application (for example, control application 57 in FIG. 7). The control application resides either in the computer 11 or in the gravimetric measuring instrument 4, 12, or 14. It is also conceivable that the control application resides in the computer 2, which is connected to the gravimetric measurement instrument 4.

The control program according to exemplary embodiments of the invention can have one or more of the following features:

Check whether the gravimetric measuring instrument, on which a validated application program is to be executed, corresponds to the specification;
Check whether the gravimetric measuring instrument is ready for use;
Monitor the individual process-steps for their execution according to the stipulations of the rule-set;
Initiate and execute emergency measures, should problems arise during execution of a process;
Interrupt the process until the problems are solved;
Document problems should they occur, etc.

Preferably, the control application and the application program are matched to each other to ensure trouble-free functioning. Also, with a good match, for example use of an application program specifically for scales/balances and exactly matched to the balance, the full functionality of a balance can be used.

The user or customer can create his own application without special knowledge of programming. Once defined and validated, application programs can be saved and repeated.

Any combinations of the embodiments shown and/or described fall within the scope of the present invention, even if these combinations are not explicitly presented. The reference numbers in all figures always designate the same elements, even though these are not always explained in detail.

In a further embodiment of the invention, when creating an application program, the user is guided step by step either by being offered a selection list, or by the next steps for execution being highlighted by graphical means.

In a further embodiment of the invention, monitoring of the application program during its execution also includes monitoring of the network and/or other components, such as for example the peripheral devices, of a total system.

Preferably, the creation of an application program can take place in such manner that time sequences, loops (for example, for repetition of certain process-steps) and parameters can be prescribed. For this purpose, the software offers, for example, a menu-controlled interface and a command line (command prompt). Interfaces are present, through which data or other information can be imported or exported.

Thus, for example, the application modules can have interfaces for transferring or readying data. Preferably, such an interface is represented graphically on the respective graphical element of this application module as an interface. When linking two application modules, each of which has one interface, the graphically represented interfaces can, for example, be linked by means of a pointing device, preferably by means of a computer mouse.

Preferably, creation of an application is accompanied by a help function, e.g. in the form of a context-sensitive help function.

In a further embodiment, interfaces are offered to the database formats, work lists, and spreadsheets in common use.

It is an advantage of exemplary embodiments of the invention that even most complicated applications can be created with an easy-to-use drag-and-drop method. Use of the software module 7 is intuitive, and easy to learn.

The software module 7 can be modularly constructed, and further application modules can be loaded at any time, or older versions can be replaced by newer releases.

In a further embodiment, the rule-set is an implementation of a standard, or of a de facto standard which is generally designated as a standard.

According to exemplary embodiments of the invention, an application program can take the form of an application or an applet.

Exemplary embodiments of the invention allow complete definition of application programs and their control during execution on a gravimetric measuring instrument.

Standard procedures can be loaded from a library in which they are made ready. Such standard procedures can be modified or added to for the purpose of creating own applications. The library of standard applications can either be made available by the manufacturer, or the standard applications can be provided by the user of the gravimetric measuring instrument, or by the company or institution in which the measuring instrument is used.

Exemplary embodiments of the invention enable the user to create a complete application, including all weighing steps, with simple point-and-click steps and corresponding links. Each individual application module can be simply added, removed, or replaced.

Exemplary embodiments of the present invention are especially beneficial in the field of laboratory information management systems (LIMS), or where these are used, or in the production environment, where all steps and operations must be meticulously documented.

The user or operator can ensure that all steps are executed completely and correctly, and that their execution is meticulously documented electronically.

All inputs and outputs can be software-controlled.

Exemplary embodiments make available a sort of process editor, which is very powerful. Inter alia, this process editor is characterized through an automatic validation being executed.

A report structure can be specified. This can take place, for example, by means of an extension of the rule-set. The report structure can define whether, when, and in what form reporting should take place in the event of problems or special situations arising in a process. It is possible, for example, to specify that an additional system is notified, or a supervising person informed.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Method for computer-aided creation of an application program which is executable on a gravimetric measuring instrument, wherein for creating the application program use is made of a computer which contains a display device and an input device, and wherein the method comprises:
   representation of several application modules on the display device;
   selection of a first application module by means of the input device;
   selection of a second application module by means of the input device;
   linking the first application module to the second application module by means of the input device to define a link which determines a chronological sequence of the first application module and the second application module;
   computer-aided conversion of the selected first and second application modules and the link into an application program; and
   computer-aided validation of the application program by application of a prescribed rule-set, wherein:
      the application program is released for use if the validation is successfully completed; or
      computer-aided adaptation of the application program with renewed computer-aided validation is performed if the validation was not successful.

2. Method according to claim 1, wherein on the display device a graphical user interface is represented which contains a worktop by which application modules, represented as graphical elements, can be moved and positioned by means of the input device.

3. Method according to claim 2, wherein for transferring or readying data, at least one of the first and second application modules has an interface, which is graphically represented as an interface on a corresponding graphical element of the at least one application module.

4. Method according to claim 3, wherein the linking includes linking the graphically represented interface to another graphically represented interface, or to another graphical element, by means of a pointing device.

5. Method according to claim 1, wherein the rule-set is an implementation of a standard, or of a legal regulation.

6. Method according to claim 5, wherein the legal regulation is from a United States Code of Federal Regulations, or an adaptation thereof.

7. Method according to claim 1, wherein the validation is executed such that only application programs that fulfill the rule-set are released for use.

8. Method according to claim 1, wherein an application program which is released for use is provided to the gravimetric measuring instrument via a data carrier or a network.

9. Method according to claim 1, wherein parameters for at least one of the application modules are definable which have an influence on an operation and/or function of the at least one application module.

10. Method according to claim 1, comprising:
    execution of the application program;
    monitoring of the application program while it is executed;
    verifying whether execution of the application program takes place according to the prescribed rule-set; and
    interruption or branching of execution of the application program when a violation of a rule of the prescribed rule-set, or a non-compliance with the prescribed rule-set, is detected.

11. Method according to claim 10, wherein the method contains one of:
    documentation, when a violation of a rule of the prescribed rule-set, or a non-compliance with the prescribed rule-set, is detected;
    recording the execution of the application program.

12. Method according to claim 10 comprising, while monitoring the application program during execution:
    repeated monitoring of whether the link between application modules is present or interrupted; and
    when such a link is interrupted,
       execution of a recovery attempt, or
       interruption of execution of the application program until the link is present again.

13. System comprising:
    a software module;
    a computer for computer-aided creation of an application program, wherein the computer contains the software module, a display device, and an input device;
    a gravimetric measuring instrument for execution of the application program;
    a communications link via which the computer can be linked to the measuring instrument, wherein during execution of the software module, the computer:
       represents plural application modules on the display device;
       aids selection of a first application module by means of the input device;
       aids selection of a second application module by means of the input device;
       aids linking the first application module to the second application module by means of the input device to define a link which determines a chronological sequence of the first application module and the second application module;
       converts the selected first and second application modules and the link into an application program; and
       validates the application program by application of a prescribed rule-set, wherein:
          the application program is released for use when the validation is successfully completed; or
          computer-aided adaptation of the application program with renewed computer-aided validation is performed when the validation was not successful.

14. System according to claim 13, wherein the software module represents, on the display device, a graphical user interface which contains a worktop by which the first and second application modules are represented as graphical elements, to be moved and positioned by means of the input device.

15. System according to claims 14, wherein the computer can be linked to a memory in which the rule-set is prescribed, wherein the rule-set is an implementation of a standard, or of a legal regulation.

16. System according to claim 15, wherein the legal regulation is a United States Code of Federal Regulations, or an adaptation thereof.

17. System according to claim 13, wherein the validation is executable such that only an application program that fulfills the rule-set is released for use.

18. System according to claim 17, wherein an application program which is released for use can be provided to the gravimetric measuring instrument via a data carrier or via the communications link.

19. System according to claim 13, wherein the system contains verification means to:
monitor execution of the application program;
verify during execution of the application program whether execution of the application program takes place according to the prescribed rule-set; and
initiate interruption or branching of the execution of the application program when a violation of rules of the prescribed rule-set, or a non-compliance with the prescribed rule-set, is detected.

20. System according to claim 13, comprising:
means of documentation for documentation when a violation of a rule of the prescribed rule-set, or a non-compliance with the prescribed rule-set, is detected.

21. System according to claim 20, comprising:
further means of documentation, which permanently record execution of the application program.

22. System according to claim 13, comprising:
means of verification to monitor repeatedly whether the link between the first and second application modules is present or interrupted, and when the link is interrupted, to trigger execution of an attempt at recovery, or to interrupt further execution of the application program until the link is again present.

23. System according to claim 13, comprising:
means of storage which is connectable with the measuring instrument, wherein the means of storage serves as a medium for recording information which is associated with the execution of the application program in a relational database.

24. System according to claim 13, wherein the communications link is a secure link.

25. Gravimetric measuring instrument comprising:
a network interface for establishment of a communications link to a computer, or with an interface for establishment of a direct link to a computer;
a memory for storage of an application program;
a processor for execution of the application program; and
means which enable the computer to:
monitor the execution of the application program;
verify during execution of the application program whether execution of the application program takes place according to a prescribed rule-set; and
interrupt execution of the application program when a violation of a rule of the prescribed rule-set, or a non-compliance with the prescribed rule-set, is detected.

26. Measuring instrument according to claim 25, wherein the rule-set is an implementation of a standard, or of a legal regulation.

27. Measuring instrument according to claim 26, wherein the legal regulation is a United States Code of Federal Regulations, or an adaptation thereof.

28. Measuring instrument according to claim 27, comprising:
means of validation which ensure that only application programs are executable which fulfill the rule-set and/or are released by the computer for use.

29. Measuring instrument according to claim 25, wherein the application program is an application or an applet.

30. Measuring instrument according to claim 25, wherein the application program is defined as a measurement process which can be executed on the measuring instrument.

31. Software embodied in a machine readable medium for use in a computer to enable creation of an application program which is executable on a gravimetric measuring instrument, wherein the computer when executing the software aids execution of the following steps:
representation of several application modules on a display device;
selection of a first application module;
selection of a second application module;
linking the first application module to the second application module to define a link which determines a chronological sequence of the first application module and of the second application module;
conversion of the selected first and second application modules and of the link into an application program; and
validation of the application program by application of a prescribed rule-set, wherein
the application program is released for use when validation is successfully completed, or
computer-aided adaptation of the application program with renewed computer-aided validation is performed when the validation was not successful.

32. Software according to claim 31, which represents, on a display device of the computer, a graphical user interface which contains a worktop by which the first and second application modules can be moved and positioned by means of an input device, wherein the application modules are represented as graphical elements.

33. Software according to claim 32, wherein the rule-set is an implementation of a standard, or of a legal regulation.

34. Software according to claim 33, wherein the legal regulation is a United States Code of Federal Regulations or an adaptation thereof.

35. Software according to claim 31, wherein the validation is executed such that only an application program that fulfills the rule-set is released for use.

36. Software according to claim 31, wherein the software provides to the gravimetric measuring instrument, via a data carrier or a network, an application program which is released for use.

* * * * *

UNITED STATES PATENT AND TRADEMARK OFFICE
CERTIFICATE OF CORRECTION

| | |
|---|---|
| PATENT NO. | : 7,376,934 B2 |
| APPLICATION NO. | : 10/458650 |
| DATED | : May 20, 2008 |
| INVENTOR(S) | : Markus Steinrisser et al. |

It is certified that error appears in the above-identified patent and that said Letters Patent is hereby corrected as shown below:

Title page, Item 73 (Assignee): change "Mettler-Toledo AG, Grifensee (CH)" to -- Mettler-Toledo AG, Greifensee (CH) --.

Signed and Sealed this

Ninth Day of December, 2008

JON W. DUDAS
*Director of the United States Patent and Trademark Office*